(12) United States Patent
Catane

(10) Patent No.: US 8,751,492 B1
(45) Date of Patent: Jun. 10, 2014

(54) SYSTEM, METHOD, AND COMPUTER PROGRAM PRODUCT FOR SELECTING AN EVENT CATEGORY BASED ON A CATEGORY SCORE FOR USE IN PROVIDING CONTENT

(75) Inventor: Avishai Catane, Bet Shemesh (IL)

(73) Assignee: Amdocs Software Systems Limited, Dublin (IE)

( * ) Notice: Subject to any disclaimer, the term of this patent is extended or adjusted under 35 U.S.C. 154(b) by 935 days.

(21) Appl. No.: 12/016,001

(22) Filed: Jan. 17, 2008

(51) Int. Cl.
*G06F 17/30* (2006.01)
*G06Q 30/00* (2012.01)

(52) U.S. Cl.
USPC .................. 707/734; 705/14.53; 707/748

(58) Field of Classification Search
USPC ............ 705/14.4, 14.51, 14.52, 14.53, 14.54, 705/14.73; 707/723, 725, 727, 731, 734, 707/748, 750, 751
See application file for complete search history.

(56) References Cited

U.S. PATENT DOCUMENTS

| | | | | |
|---|---|---|---|---|
| 6,112,181 A * | 8/2000 | Shear et al. | ..................... | 705/10 |
| 6,151,565 A * | 11/2000 | Lobley et al. | ..................... | 703/2 |
| 6,473,084 B1 * | 10/2002 | Phillips et al. | ................. | 345/440 |
| 6,839,680 B1 * | 1/2005 | Liu et al. | ....................... | 705/7.33 |
| 6,963,867 B2 * | 11/2005 | Ford et al. | ..................... | 707/752 |
| 7,089,237 B2 * | 8/2006 | Turnbull et al. | ..................... | 1/1 |
| 7,130,811 B1 * | 10/2006 | Delurgio et al. | ........... | 705/14.43 |
| 7,228,341 B2 | 6/2007 | Giacalone, Jr. | ................ | 709/218 |
| 7,809,740 B2 * | 10/2010 | Chung et al. | .................. | 707/758 |
| 7,814,109 B2 * | 10/2010 | Brower et al. | ................. | 707/751 |
| 7,836,051 B1 * | 11/2010 | Mason | .......................... | 707/734 |
| 7,930,206 B2 * | 4/2011 | Koningstein | ................ | 705/14.45 |
| 2002/0010625 A1 * | 1/2002 | Smith et al. | ..................... | 705/14 |
| 2002/0053076 A1 * | 5/2002 | Landesmann | ................... | 725/10 |
| 2002/0152463 A1 * | 10/2002 | Dudkiewicz | .................... | 725/46 |
| 2002/0161664 A1 * | 10/2002 | Shaya et al. | ..................... | 705/26 |
| 2003/0050916 A1 * | 3/2003 | Ortega et al. | ..................... | 707/1 |
| 2005/0021397 A1 | 1/2005 | Cui et al. | ........................ | 705/14 |
| 2005/0049907 A1 * | 3/2005 | Kumar et al. | .................... | 705/10 |
| 2006/0074769 A1 * | 4/2006 | Looney et al. | ................... | 705/26 |
| 2006/0150123 A1 * | 7/2006 | Goodwin et al. | ............ | 715/841 |
| 2007/0233650 A1 * | 10/2007 | Brower et al. | ..................... | 707/3 |
| 2007/0239517 A1 * | 10/2007 | Chung et al. | .................... | 705/10 |
| 2007/0239518 A1 * | 10/2007 | Chung et al. | .................... | 705/10 |
| 2007/0260596 A1 * | 11/2007 | Koran et al. | ..................... | 707/5 |
| 2007/0260624 A1 * | 11/2007 | Chung et al. | .................. | 707/101 |
| 2007/0271141 A1 * | 11/2007 | Storm | ............................. | 705/14 |
| 2008/0015938 A1 * | 1/2008 | Haddad et al. | .................. | 705/14 |
| 2008/0091497 A1 * | 4/2008 | Julien et al. | ....................... | 705/8 |
| 2009/0048933 A1 * | 2/2009 | Cho | ............................... | 705/14 |
| 2010/0121845 A1 * | 5/2010 | Aravamudan et al. | ........ | 707/723 |
| 2010/0250558 A1 * | 9/2010 | Wang | ............................. | 707/749 |

* cited by examiner

*Primary Examiner* — Kenneth Bartley
(74) *Attorney, Agent, or Firm* — Zilka-Kotab, PC

(57) ABSTRACT

A system, method, and computer program product are provided for selecting an event category based on a category score for use in providing content. In use, category score is determined for each of a plurality of categories of events, the category score based on a time period since an occurrence of at least one of the events. Further, at least one of the categories is selected based on the category score, for use in providing content associated with the selected at least one category.

12 Claims, 5 Drawing Sheets

US 8,751,492 B1

SYSTEM, METHOD, AND COMPUTER PROGRAM PRODUCT FOR SELECTING AN EVENT CATEGORY BASED ON A CATEGORY SCORE FOR USE IN PROVIDING CONTENT

FIELD OF THE INVENTION

The present invention relates to providing content, and more particularly to providing content based on events.

BACKGROUND

Traditionally, systems have provided content for various purposes. For example, systems oftentimes provide content to users for advertising purposes. However, such traditional content providing systems have generally exhibited various limitations.

Just by way of example, content providing systems have customarily provided content based on information included in user profiles. Thus, a user may receive content specific to such user's profile. However, a user profile has commonly been created based on events associated with the user, without consideration of a relevancy of the events.

There is thus a need for addressing these and/or other issues associated with the prior art.

SUMMARY

A system, method, and computer program product are provided for selecting an event category based on a category score for use in providing content. In use, category score is determined for each of a plurality of categories of events, the category score based on a time period since an occurrence of at least one of the events. Further, at least one of the categories is selected based on the category score, for use in providing content associated with the selected at least one category.

DETAILED DESCRIPTION

Figure 1:
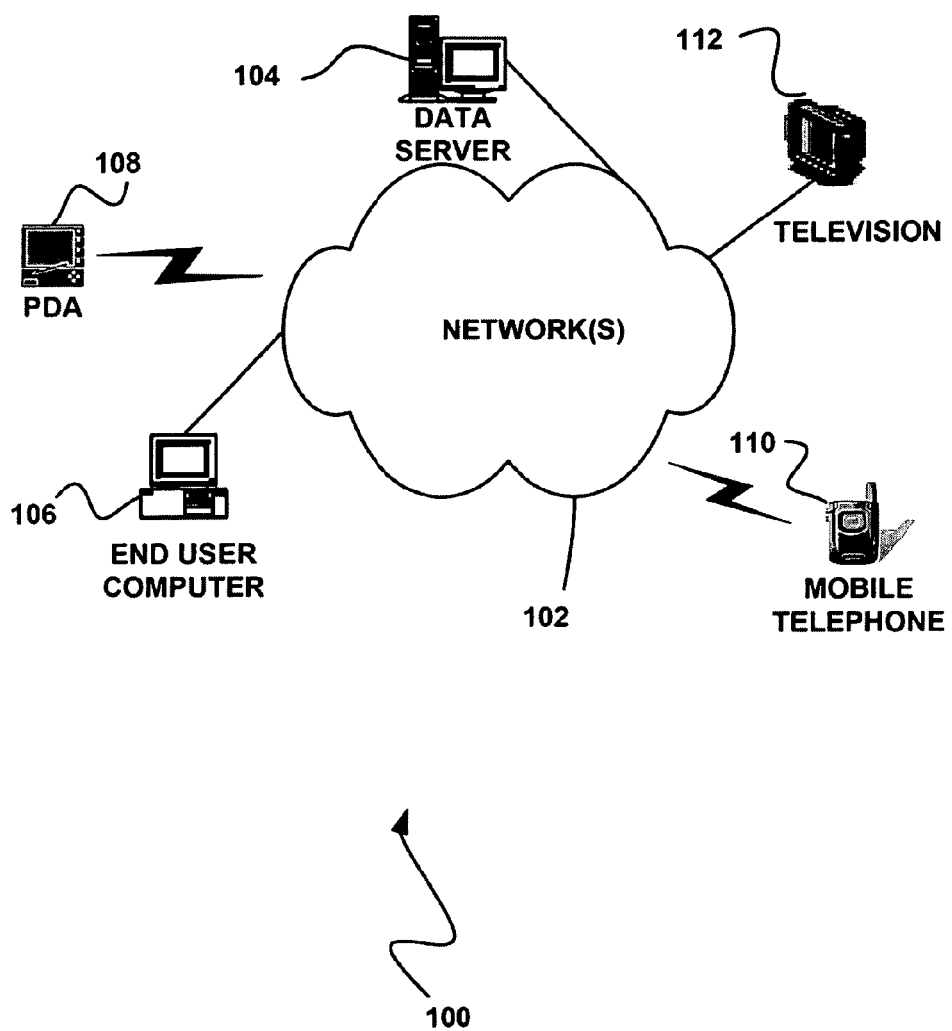
FIG. 1 illustrates a network architecture, in accordance with one possible embodiment.

FIG. 1 illustrates a network architecture 100, in accordance with one possible embodiment. As shown, at least one network 102 is provided. In the context of the present network architecture 100, the network 102 may take any form including, but not limited to a telecommunications network, a local area network (LAN), a wireless network, a wide area network (WAN) such as the Internet, peer-to-peer network, cable network, etc. While only one network is shown, it should be understood that two or more similar or different networks 102 may be provided.

Coupled to the network 102 is a plurality of devices. For example, a server computer 104 and an end user computer 106 may be coupled to the network 102 for communication purposes. Such end user computer 106 may include a desktop computer, lap-top computer, and/or any other type of logic. Still yet, various other devices may be coupled to the network 102 including a personal digital assistant (PDA) device 108, a mobile phone device 110, a television 112, etc.

Figure 2:
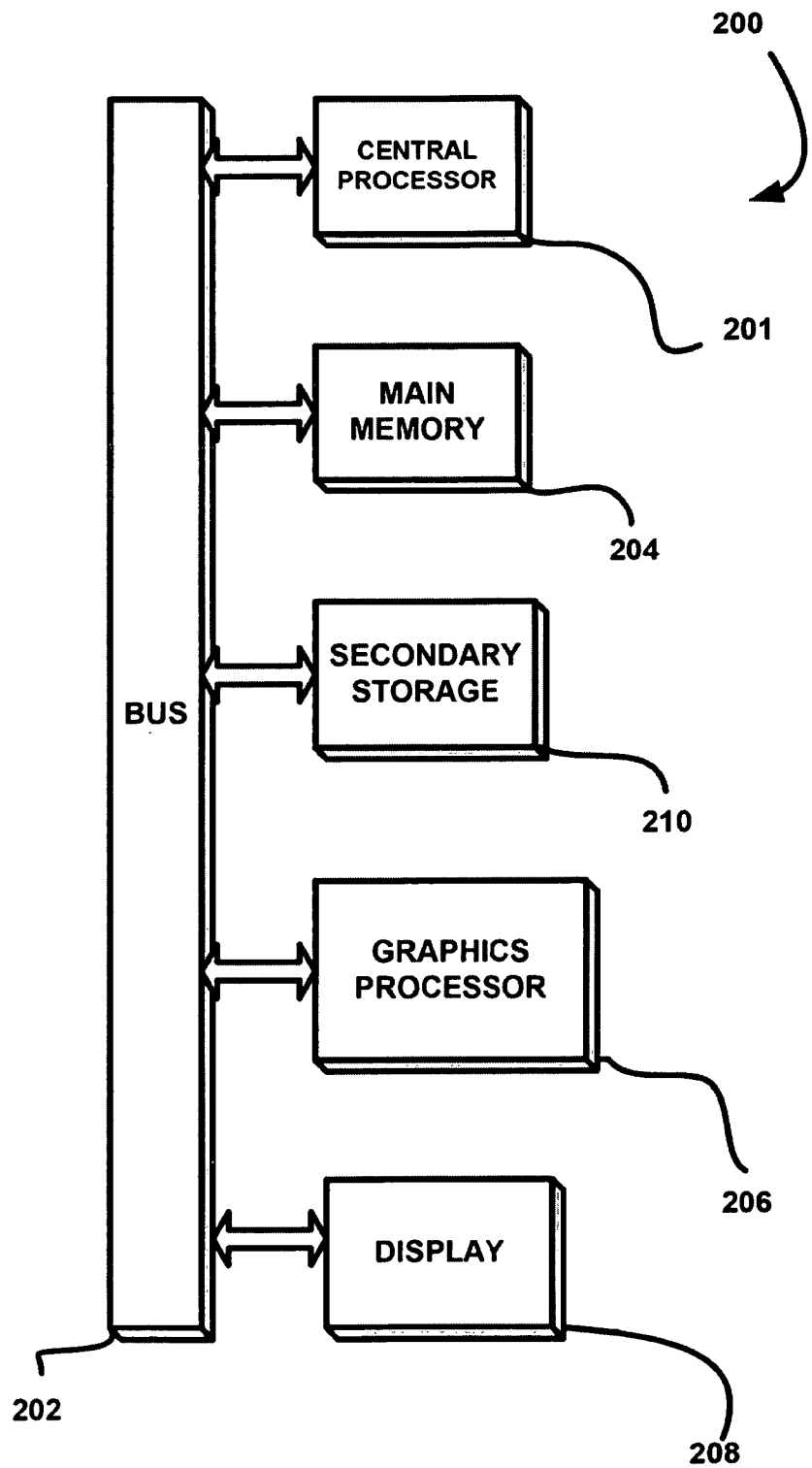
FIG. 2 illustrates an exemplary system, in accordance with one embodiment.

FIG. 2 illustrates an exemplary system 200, in accordance with one embodiment. As an option, the system 200 may be implemented in the context of any of the devices of the network architecture 100 of FIG. 1. Of course, the system 200 may be implemented in any desired environment.

As shown, a system 200 is provided including at least one central processor 201 which is connected to a communication bus 202. The system 200 also includes main memory 204 [e.g. random access memory (RAM), etc.]. The system 200 also includes a graphics processor 206 and a display 208.

The system 200 may also include a secondary storage 210. The secondary storage 210 includes, for example, a hard disk drive and/or a removable storage drive, representing a floppy disk drive, a magnetic rape drive, a compact disk drive, etc. The removable storage drive reads from and/or writes to a removable storage unit in a well known manner.

Computer programs, or computer control logic algorithms, may be stored in the main memory 204 and/or the secondary storage 210. Such computer programs, when executed, enable the system 200 to perform various functions (to be set forth below, for example). Memory 204, storage 210 and/or any other storage are possible examples of computer-readable media.

Figure 3:
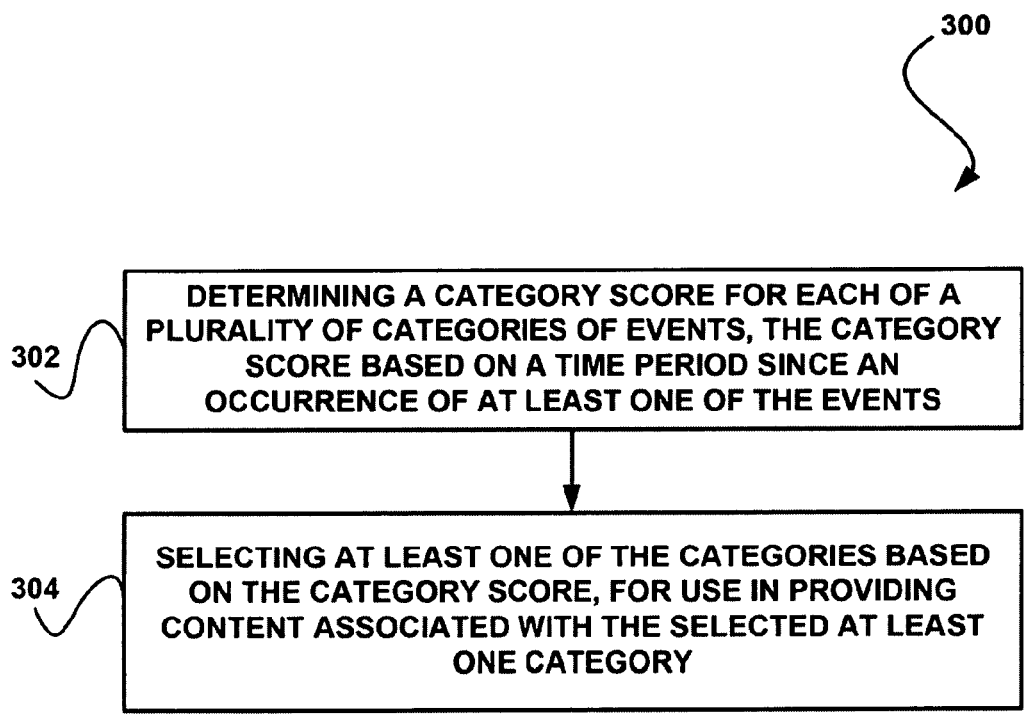
FIG. 3 illustrates a method for selecting an event category based on a category score for use in providing content, in accordance with one embodiment.

FIG. 3 illustrates a method 300 for selecting an event category based on a category score for use in providing content, in accordance with one embodiment. As an option, the method 300 may be carried out in the context of the details of FIGS. 1 and/or 2. Of course, however, the method 300 may be carried out in any desired environment. Further, the aforementioned definitions may equally apply to the description below.

As shown in operation 302, a category score is determined for each of a plurality of categories of events, where the category score is based on a time period since an occurrence of at least one of the events. In the context of the present embodiment, the event may include any initiated action. As an option, the events may be initiated by a user.

As another option, the events may be initiated over a network (e.g. the Internet, etc.). Still yet, the events may be initiated utilizing any of the devices described above with respect to FIGS. 1 and/or 2. For example, the events may be performed utilizing a network browser.

In various embodiments, the events may include a search for data, a selection of data, a download of data, a request for data, a purchase, etc. Such data may optionally include a web page, an image, video, audio, an advertisement, an electronic coupon, etc. Additionally, the events may be identified based on monitoring of events.

To this end, the categories of events may include any categories capable of being associated with the events. In one embodiment, the categories may be predefined. In another embodiment, each of the categories of events may include a different type of event (e.g. a search for data, a selection of data, a download of data, a request for data, a purchase, etc.). In yet another embodiment, the categories of events may include types of content associated with the events (e.g. sports, news, particular products, particular services, etc.). In still yet another embodiment, the categories may be defined in a reference table.

Thus, each of the events may be categorized in one of the categories according to a type of the event. Furthermore, each categorized event may be stored in a database. For example, each categorized event may be stored in association with at least one identifier of a user that initiated the categorized event. Accordingly, the events may be stored per user and category. As another option, any desired number of keywords associated with the categorized events (e.g. describing the categorized events, etc.) may be stored in the database in correlation with the categorized events.

Moreover, the category score may include any score for a category that is based, at least in part, on a time period since an occurrence of at least one of the events. In this way, each category of events may optionally be associated with a different category score. Optionally, the category score may include a numerical score, but of course may include any value within a predefined range of values capable of indicating a score of a category. Additionally, the category score may be determined utilizing an algorithm.

Just by way of example, a time associated with an event (e.g. initiation of the event, completion of the event, etc.) may be identified and compared to a current time for determining a time period since the occurrence of such event. As another example, a time period since an occurrence of each event in a category may be determined. Further, each time period associated with each event may be utilized in determining the category score for such category.

In one embodiment, a category including more recent events may be associated with a higher category score than another category including less recent events. Thus, if the time period since an occurrence of an event is larger than a predetermined amount, the category score for the category of such event may be lower than if the time period is smaller than the predetermined amount, for example. Of course, however, the category scores may be determined utilizing any desired algorithm that is based, at least in part, on a time period since an occurrence of at least one of the events.

For example, as an option, the category score may also be based on a recurrence of events within the associated category. Just by way of example, a category with recurring events may be associated with a higher score than another category without or with a lower number of recurring events. As yet another option, the category score may be based on a time interval between recurring events and/or events determined to be similar based on predetermined characteristics. For example, a category with events that reoccur at smaller time intervals may be associated with a higher category score than a category with events that reoccur at larger time intervals.

As yet a further option, the category score may be based on a current time. Just by way of example, if a reoccurring event is determined to occur at a weekly time interval on a particular day of the week, the category for such event may be associated with a higher category score on the particular day of the week than other days of the week. As another example, the category of such reoccurring event may optionally be associated with a highest category score than the category scores of the other categories on the particular day of the week on which such event reoccurs.

Still yet, at least one of the categories is selected based on the category score, for use in providing content associated with the selected at least one category, as shown in operation 304. In one embodiment, the category may be selected based on the type of category scoring algorithm utilized to determine the category scores. For example, a category with a highest category score may be selected.

In addition, the number of categories selected may be predefined. As another option, the number of categories selected may be based on a number indicated in a request for the categories. Thus, the category may optionally be selected in response to a request for such category. Optionally, the request may be issued by a content provider (e.g. advertiser, etc.).

Further, the selected category may be utilized for providing content associated with the content in any manner. In the context of the present embodiment, the content may include any information, data, etc. categorized under the selected category. For example, the content may include an advertisement, media, etc. Further, the content may include web content, interne protocol television (IPTV) content, mobile device content, and/or any other content capable of being provided.

In one embodiment, the content may be provided to a user that initiated the events. Just by way of example, the content may be provided over a network, via a device utilized by the user, via a network browser, etc. In this way, a category of events determined to be most relevant to a user with respect to a time since at least one of such events may be selected. Such selection may allow content associated with the selected category to be identified for providing relevant content to the user.

More illustrative information will now be set forth regarding various optional architectures and uses in which the foregoing method may or may not be implemented, per the desires of the user. It should be strongly noted that the following information is set forth for illustrative purposes and should not be construed as limiting in any manner. Any of the following features may be optionally incorporated with or without the exclusion of other features described.

Figure 4:
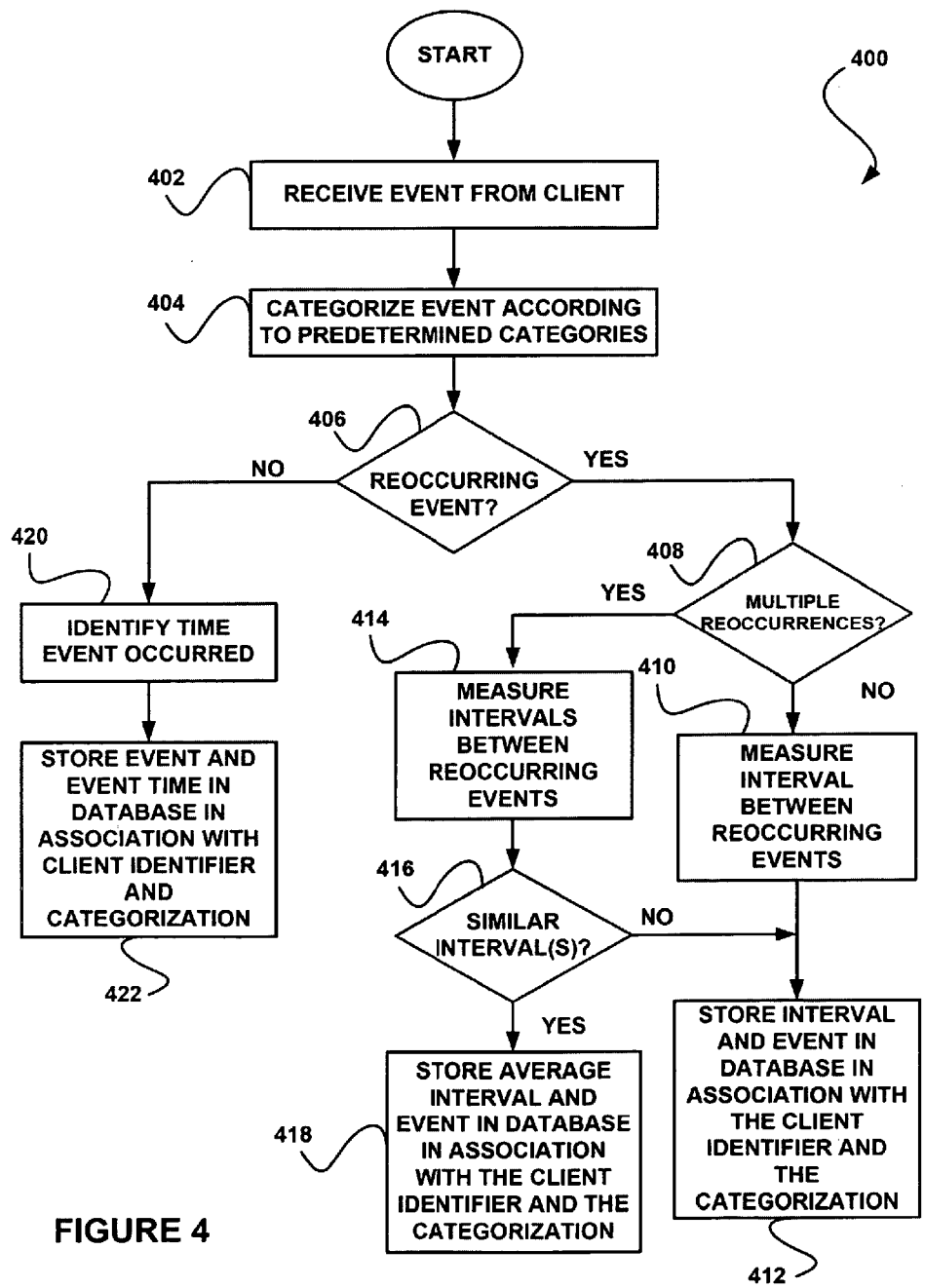
FIG. 4 illustrates a method for storing events and a relative time to such events in a database, in accordance with another embodiment.

FIG. 4 illustrates a method 400 for storing events and a relative time to such events in a database, in accordance with another embodiment. As an option, the method 400 may be carried out in the context of the details of FIGS. 1-3. Of course, however, the method 400 may be carried out in any desired environment. Further, the aforementioned definitions may equally apply to the description below.

As shown in operation 402, an event is received from a client. The client may include any of the client devices described above with respect to FIGS. 1 and/or 2. In one embodiment, the client may monitor events initiated on the client for sending events to a central database capable of storing such events. Accordingly, the event may be received by a database remotely located with respect to the client (e.g. remotely located over a network, etc.).

In addition, the event is categorized according to predetermined categories, as shown in operation 404. In one embodiment, characteristics of the event may be utilized for categorizing the event. For example, characteristics of the event may be compared to characteristics of each of the predetermined categories for determining which predetermined category characteristics match the event characteristics.

Such characteristics may include a type of the event (e.g. a search, a request, a download, etc.), as an option. Thus, the event may be categorized according to one of the predetermined categories with matching characteristics. Of course, however, the event may be categorized according to the predetermined categories in any desired manner.

Further, as shown in decision 406, it is determined whether the event is a reoccurring event. In the context of the present embodiment, the event may be a reoccurring event if the event has previously occurred at least one other time with respect to a single user. Optionally, the determination may be made by querying a database storing events for a previous occurrence of the event associated with the user that initiated the event.

If it is determined that the event is a reoccurring event, it is further determined whether there have been multiple reoccurrences of the event, as shown in decision 408. For example, it may be determined whether the event has previously occurred at least two other times with respect to the user. Optionally, the determination may be made by querying the database storing the events for previous occurrences of the event associated with the user that initiated the event, and further determining whether the results of the query indicate more at least two events.

If it is determined that there have not been multiple reoccurrences of the event, an interval between the event and the previous occurrence of the event is measured. Note operation 410. In one embodiment, the interval may include a time interval. For example, the interval may be measured by determining a difference between the time of the event and a time of the previous occurrence of the event. In another embodiment, the interval may include a particular day of the week on which the event reoccurred. Of course, however, the interval may be measured in any manner.

Furthermore, the interval and event are stored in a database in association with an identifier of the client and the categorization of the event. Note operation 412. Thus, results of a query for the event may include the interval. Optionally, a time of the event may also be stored in the database.

If, however, it is determined that there have been multiple reoccurrences of the event, intervals between each of the subsequent instances of reoccurring events are measured. Note operation 414. Thus, an interval between a previous occurrence of the event and a subsequent reoccurrence of the event may be measured for each reoccurrence.

Further, it is determined whether the measured intervals are similar, as shown in decision 416. In the context of the present description, the intervals may be similar if the intervals are within a predefined threshold of one another. Just by way of example, the intervals may be determined to be similar if the intervals are within one hour of one another, etc. Optionally, determining whether the intervals are similar may include determining whether a predetermined number, percentage, etc. of the intervals are similar.

If it is determined that the intervals are not similar, the interval measured between the event received from the client and the previous occurrence of the event is stored in the database in association with the identifier of the client and the categorization of the event (operation 412). If, however, it is determined that the intervals are similar, an average of the similar intervals is calculated and stored in the database in association with the identifier of the client and the categorization of the event. Note operation 418. In this way, an interval and/or average interval between reoccurring events may be stored in the database.

Still yet, as shown in operation 420, if it is determined in decision 406 that the event is not a reoccurring event, a time the event occurred is identified. For example, the time of occurrence may be identified utilizing the event received from the client. Thus, the event may indicate the time of the occurrence. As also shown, the event and the time of the occurrence of the event are stored in the database in association with the identifier of the client and the categorization of the event. Note operation 422.

Figure 5:
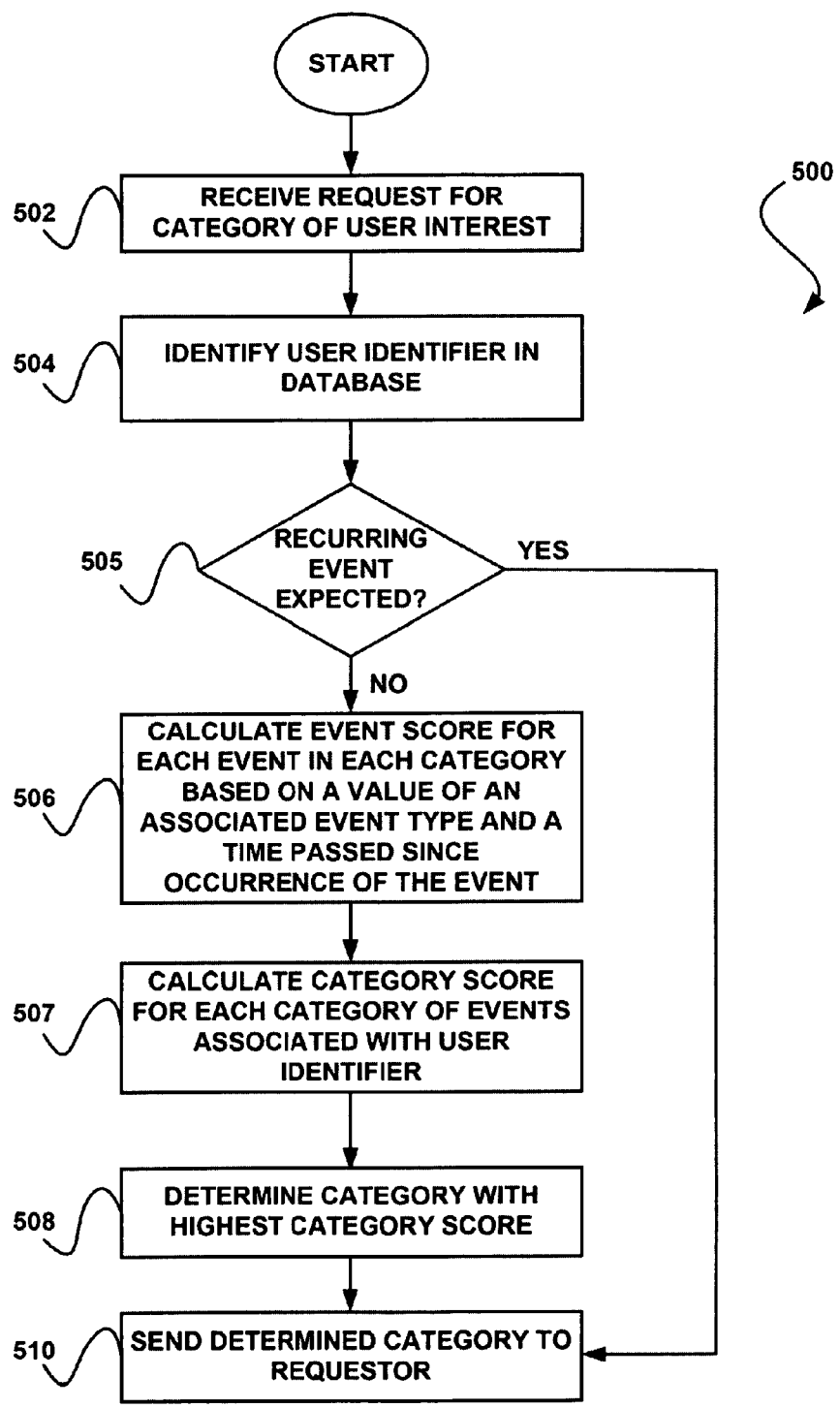
FIG. 5 illustrates a method for sending a category of events to a requestor, in accordance with yet another embodiment.

FIG. 5 illustrates a method 500 for sending a category of events to a requestor, in accordance with yet another embodiment. As an option, the method 500 may be carried out in the context of the details of FIGS. 1-4. Of course, however, the method 500 may be carried out in any desired environment. Again, the aforementioned definitions may equally apply to the description below.

As shown in operation 502, a request for a category of user interest is received. In the context of the present embodiment, the category of user interest may include any category of content that is of interest to the user. For example, the category of user interest may include a particular type of product, a particular type of service, etc.

Optionally, the request may be received from a content provider. Just by way of example, the request may be received from an advertiser. As another option, the request may be received by a database storing categories of events that have been determined to be of interest to a plurality of users (e.g. based on events initiated by the users, etc.).

In addition, a user identifier is identified in a database, as shown in operation 504. Such database may include the database storing categories of events that have been determined to be of interest to a plurality of users, as an option. Just by way of example, the database may include the database described above with respect to FIG. 4.

In one embodiment, the user identifier may be an identifier of the user whose category of interest is requested. In another embodiment, the user identifier may be unique to the user. For example, a content provider may wish to communicate content to a particular user, and thus may request a category of interest associated with the particular user. Optionally, the request may indicate the user. To this end, the user identifier may be identified by querying the database for the user.

Moreover, it is determined whether a recurring event is expected, as shown in decision 505. In one embodiment, the determination may be based on a predetermined time period. For example, it may be determined whether a recurring event is expected within the predetermined time period (e.g. the next day, etc.).

In another embodiment, the determination may be based on whether an event has previously reoccurred. If the event has previously reoccurred, then it may be determined that a recurring event is expected. Optionally, an average time between such previously occurring recurring events may be utilized for determining a time period when the next recurring event is expected.

In yet another embodiment, the determination may be made with respect to each event in each category of events associated with the user identifier. Accordingly, as described above, the database may store categories of events for each of a plurality of users. The categorized events may include events initiated by the users, for example.

Still yet, if a recurring event is not expected, an event score for each event in each of the categories of events associated with the user identifier is calculated based on a value of an associated event type and a time passed since occurrence of the event. Note operation 506. Thus, in one embodiment, the event score may be based on the type (e.g. categorization) of the event. Optionally, each category of events may be associated with a predetermined score (e.g. user configured, etc.). Thus, a download of a coupon may be associated with a higher weight than a search for information, for example.

In addition, in another embodiment, the event score may be based on a time period since the occurrence of the event. Optionally, the time period may be determined based on a difference between a current time and a time the event occurred. As another option, an event which occurred more recently (e.g. a day prior, etc.) may be scored higher than an event which occurred less recently (e.g. a month prior, etc.).

In one exemplary embodiment, a user may search for a first type of restaurant during a previous month, and may also search for a second different type of restaurant at a time more recent than the previous month. Thus, the search for the second type of restaurant may be associated with a larger event score than the search for the first type of restaurant, since the search for the second type of restaurant occurred within a lesser time period than the search for the first type of restaurant occurred.

In yet another embodiment, the event score may be based on a time of day of the occurrence of the event. Just by way of example, the time of day of the event may be compared with the current time, such that the event score may include a maximum score if the current time matches the time of day of the event. Of course, however, the event score may also be based on a day of week of the occurrence of the event, and so forth.

In still yet another embodiment, the event score may be based on a reoccurrence of the event. As an option, reoccurring events may be associated with a higher event score than non-reoccurring events. As another option, events with more reoccurrences may be associated with a higher event score than events with less reoccurrences.

It should be noted, however, that the event score may include any weight, value, etc. assigned to each of the events that is based, at least in part, on the value of an associated event type and the time passed since occurrence of the event. Of course, the event score may be calculated for each event in any desired manner.

Further, a category score for each category of events associated with the user identifier is calculated. Note operation 507. In one embodiment, calculating the category score may include identifying an event score for each of the events associated with the user identifier. To this end, the category score calculated for a category may be determined based on an aggregation of event scores for events in such category. Of course, however, the category score may be calculated based on any desired algorithm that utilizes, at least in part, a time period since an occurrence of an event in the associated category and a type of the event.

Once a category score is calculated for each category of events associated with the user identifier, a category with a highest category score is determined. Note operation 508. For example, each of the calculated category scores may be compared for determining a category with a highest category score. While only a single highest category score is described as being determined, it should be noted that any number of the highest category scores may be determined. As an option, the number of highest category scores determined may be predefined, may be based on the request received in operation 502, etc.

Furthermore, the determined category is sent to the requestor of the category of user interest, as shown in operation 510. In one embodiment, the determined category may include the category with the highest category score determined in operation 508. In another embodiment, however, if it is determined that an event is expected to reoccur, the determined category may include a category of the event that is expected to reoccur (note decision 505).

For example, categories of events that include reoccurring events may be associated with a higher category score than categories of events that include non-reoccurring events. As another option, categories of events that include events with more reoccurrences may be associated with a higher category score than categories of events that include events with less reoccurrences. In this way, the determined category may include a category that includes events with the most reoccurrences, in one embodiment.

Optionally, keywords associated with the category may also be identified and sent to the requestor with the category. The keywords may include keywords included in events within the category, for example, such as words indicating a particular product, words indicating a particular service, etc.

In this way, the requestor may optionally utilize the category for identifying content to be provided to the user. Just by way of example, the content may be capable of being categorized within the category. Accordingly, content within a category of events associated with the user may be provided to the user based on a relevancy of the category to the user. Such relevancy may be ensured via selection of the category with the highest category score, in one embodiment.

In one exemplary embodiment, a user may search and download content on a particular topic once a week on the same day within the week, multiple times. Thus, the user search and download of the content may be a reoccurring event. If a request for a category of user interest is requested on the day of the week in which the user has previously searched and downloaded the content, a category of events including the search and download of the content may be associated with a highest category score.

The requestor may therefore be provided with the category of events that includes the search and download of the content. To this end, the requestor may identify content within the category, such as content of the type searched for and downloaded by the user. Thus, if the user consistently searches and downloads coupons, the requestor may provide coupons to the user.

In another exemplary embodiment, a user may search a particular category of content (e.g. via keywords within such category, etc.) multiple times within a particular time period. If the time period occurred within a predetermined amount of time from the current time, the category searched for by the user may be determined to be the most relevant category associated with the user. In this way, the category may be sent to a content provider such that the content provider may provide content within the category to the user.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method, comprising:
 receiving an event associated with a user;
 determining a category of the event, where the category is one of a plurality of predetermined categories;
 determining whether the event is a recurring event, utilizing a processor;
 determining a time the event occurred, and storing the time and the event under the determined category in association with an identifier of the user in a database, when it is determined that the event is a recurring event;
 determining whether a single previous occurrence of the event or multiple previous occurrences of the event exist, when it is determined that the event is a recurring event;
 when it is determined that the single previous occurrence of the event exists:
  determining a first interval between the single previous occurrence of the event and the received event, and storing the first interval and the event under the determined category in association with the identifier of the user in the database;
 when it is determined that multiple previous occurrences of the event exist:
  measuring time intervals between each of the multiple previous occurrences,
  determining whether the time intervals are each within a predefined threshold, determining a second interval between a previous occurrence of the event and the received event, and storing the second interval and the event under the determined category in association with the identifier of the user in the database, when it is determined that the intervals are not each within the predefined threshold, and calculating an average of the time intervals and storing the average and the event under the determined category in association with the identifier of the user in the database, when it is determined that the intervals are each within the predefined threshold;

receiving from a content provider a request for a category, where the request identifies the user;

identifying the identifier of the user in the database by querying the database for the user identified in the request, where the identifier is associated with a plurality of categories stored in the database, and where each of the plurality of categories contains a plurality of events;

determining whether a recurring event associated with the user is expected to occur within a predetermined time period, utilizing the plurality of events associated with the identifier of the user;

when it is determined that the recurring event is expected to occur within the predetermined time period, returning a first category of the plurality of categories to the content provider, where the first category includes the recurring event; and when it is determined that the recurring event is not expected to occur within the predetermined time period:
calculating an event score for each of the plurality of events within the plurality of categories associated with the identifier of the user,
calculating a category score for each of the plurality of categories, where each category score is based on an aggregation of event scores for events within that category,
determining a second category of the plurality of categories with a highest category score, and
returning the second category to the content provider.

2. The method of claim 1, wherein the event is initiated by a user.

3. The method of claim 1, wherein the event includes at least one of a search for data, a selection of data, a download of data, a request for data, and a purchase.

4. The method of claim 1, wherein at least one keyword associated with each categorized event is stored in the database in correlation with an associated categorized event.

5. The method of claim 1, wherein the category score is based on a current time.

6. The method of claim 1, wherein one of the categories including more recent events has a higher category score than another one of the categories including less recent events.

7. The method of claim 1, wherein the category score is based on whether a time period since an occurrence of an event is greater or lesser than a predetermined amount, such that if the time period since the occurrence of the event is greater than the predetermined amount, then the category score for the category of such event is lower than if the time period is lesser than the predetermined amount.

8. The method of claim 1, wherein the category score is based on a time interval between recurring events and events determined to be similar based on at least one predetermined characteristic, such that a category with events that reoccur at smaller time intervals is associated with a higher category score than a category with events that reoccur at larger time intervals.

9. The method of claim 1, wherein a time period associated with each event of a particular category of events is utilized in determining the category score for such category.

10. A computer program product embodied on a non-transitory computer readable medium having a computer readable program code embodied therein, the computer readable program code adapted to be executed by a processor to implement a method comprising:

receiving an event associated with a user;
determining a category of the event, where the category is one of a plurality of predetermined categories;
determining whether the event is a recurring event;
determining a time the event occurred, and storing the time and the event under the determined category in association with an identifier of the user in a database, when it is determined that the event is a recurring event;
determining whether a single previous occurrence of the event or multiple previous occurrences of the event exist, when it is determined that the event is a recurring event;
when it is determined that the single previous occurrence of the event exists:
determining a first interval between the single previous occurrence of the event and the received event, and storing the first interval and the event under the determined category in association with the identifier of the user in the database;
when it is determined that multiple previous occurrences of the event exist:
measuring time intervals between each of the multiple previous occurrences,
determining whether the time intervals are each within a predefined threshold,
determining a second interval between a previous occurrence of the event and the received event, and storing the second interval and the event under the determined category in association with the identifier of the user in the database, when it is determined that the intervals are not each within the predefined threshold, and
calculating an average of the time intervals and storing the average and the event under the determined category in association with the identifier of the user in the database, when it is determined that the intervals are each within the predefined threshold;
receiving from a content provider a request for a category, where the request identifies the user;
identifying the identifier of the user in the database by querying the database for the user identified in the request, where the identifier is associated with a plurality of categories stored in the database, and where each of the plurality of categories contains a plurality of events;
determining whether a recurring event associated with the user is expected to occur within a predetermined time period, utilizing the plurality of events associated with the identifier of the user;
when it is determined that the recurring event is expected to occur within the predetermined time period, returning a first category of the plurality of categories to the content provider, where the first category includes the recurring event; and
when it is determined that the recurring event is not expected to occur within the predetermined time period:
calculating an event score for each of the plurality of events within the plurality of categories associated with the identifier of the user, calculating a category score for each of the plurality of categories, where each category score is based on an aggregation of event scores for events within that category, determining a second category of the plurality of categories with a highest category score, and returning the second category to the content provider.

11. A system, comprising:

a processor and a memory coupled to the processor, the memory storing instructions, which, when executed by the processor, cause the processor to:

receive an event associated with a user;

determine a category of the event, where the category is one of a plurality of predetermined categories;

determine whether the event is a recurring event;

determine a time the event occurred, and storing the time and the event under the determined category in association with an identifier of the user in a database, when it is determined that the event is a recurring event;

determine whether a single previous occurrence of the event or multiple previous occurrences of the event exist, when it is determined that the event is a recurring event;

when it is determined that the single previous occurrence of the event exists:

determine a first interval between the single previous occurrence of the event and the received event, and storing the first interval and the event under the determined category in association with the identifier of the user in the database;

when it is determined that multiple previous occurrences of the event exist:

measure time intervals between each of the multiple previous occurrences, determine whether the time intervals are each within a predefined threshold, determine a second interval between a previous occurrence of the event and the received event, and storing the second interval and the event under the determined category in association with the identifier of the user in the database, when it is determined that the intervals are not each within the predefined threshold, and calculate an average of the time intervals and storing the average and the event under the determined category in association with the identifier of the user in the database, when it is determined that the intervals are each within the predefined threshold;

receive from a content provider a request for a category, where the request identifies the user;

identify the identifier of the user in the database by querying the database for the user identified in the request, where the identifier is associated with a plurality of categories stored in the database, and where each of the plurality of categories contains a plurality of events;

determine whether a recurring event associated with the user is expected to occur within a predetermined time period, utilizing the plurality of events associated with the identifier of the user;

when it is determined that the recurring event is expected to occur within the predetermined time period, return a first category of the plurality of categories to the content provider, where the first category includes the recurring event; and when it is determined that the recurring event is not expected to occur within the predetermined time period:

calculate an event score for each of the plurality of events within the plurality of categories associated with the identifier of the user, calculate a category score for each of the plurality of categories, where each category score is based on an aggregation of event scores for events within that category, determine a second category of the plurality of categories with a highest category score, and return the second category to the content provider.

12. The system of claim 11, wherein the processor is coupled to the memory via a bus.

* * * * *